US012664800B2

(12) United States Patent
Sherry et al.

(10) Patent No.: US 12,664,800 B2
(45) Date of Patent: Jun. 23, 2026

(54) PERSONALIZED AUTHENTICATION OF PRODUCTS USING TERAHERTZ WAVES

(71) Applicant: TIHIVE, Grenoble (FR)

(72) Inventors: Hani Sherry, Grenoble (FR); Carlos Prada Rojas, Grenoble (FR); Nicolas Beaudouin, Grenoble (FR)

(73) Assignee: TIHIVE, Grenoble (FR)

( * ) Notice: Subject to any disclaimer, the term of this patent is extended or adjusted under 35 U.S.C. 154(b) by 103 days.

(21) Appl. No.: 18/548,861

(22) PCT Filed: Mar. 1, 2022

(86) PCT No.: PCT/FR2022/050363
§ 371 (c)(1),
(2) Date: Sep. 1, 2023

(87) PCT Pub. No.: WO2022/185006
PCT Pub. Date: Sep. 9, 2022

(65) Prior Publication Data
US 2024/0153292 A1 May 9, 2024

(30) Foreign Application Priority Data
Mar. 1, 2021 (FR) ...................................... 2101957

(51) Int. Cl.
*G06V 20/80* (2022.01)
*G06V 10/12* (2022.01)
(52) U.S. Cl.
CPC .............. *G06V 20/80* (2022.01); *G06V 10/12* (2022.01)

(58) Field of Classification Search
CPC ................................ G06V 20/80; G06V 10/12
See application file for complete search history.

(56) References Cited

U.S. PATENT DOCUMENTS

| | | | |
|---|---|---|---|
| 5,583,950 A * | 12/1996 | Prokoski ............ | G06V 10/7515 382/218 |
| 7,449,695 B2 * | 11/2008 | Zimdars ............. | G01N 21/3586 250/341.7 |
| 8,497,983 B2 | 7/2013 | Cowburn et al. | |
| 8,569,099 B2 * | 10/2013 | Sachs ..................... | C25D 5/022 257/E31.13 |

(Continued)

FOREIGN PATENT DOCUMENTS

| | | |
|---|---|---|
| GB | 2097979 A | 11/1982 |
| WO | 2019155156 A1 | 8/2019 |
| WO | 2019186074 A1 | 10/2019 |

OTHER PUBLICATIONS

International Search Report and Written Opinion of the International Searching Authority dated Jun. 3, 2022, in connection with International Application No. PCT/FR2022/050363, 11 pages.

(Continued)

*Primary Examiner* — Philip P. Dang

(57) ABSTRACT
A method for authenticating an article is provided, comprising the following steps in a reference signature generation phase: acquiring a reference density image of a volume beneath a reference area of the article using a proximity terahertz imager array; and generating and storing a reference signature associated with the article from the reference density image.

12 Claims, 2 Drawing Sheets

(56) References Cited

U.S. PATENT DOCUMENTS

| | | | | |
|---|---|---|---|---|
| 8,712,163 | B1 * | 4/2014 | Osheroff | G06Q 30/0185 |
| | | | | 424/467 |
| 9,083,324 | B2 * | 7/2015 | Sherry | H03B 27/00 |
| 9,117,133 | B2 * | 8/2015 | Barnes | A61B 5/0077 |
| 9,561,019 | B2 * | 2/2017 | Mihailescu | A61B 8/462 |
| 9,798,917 | B2 * | 10/2017 | Benkley, III | G06V 40/1335 |
| 10,716,469 | B2 * | 7/2020 | Krueger | A61B 3/112 |
| 10,810,731 | B2 * | 10/2020 | Kozicki | B42D 25/36 |
| 10,939,844 | B2 * | 3/2021 | Grundfest | A61B 5/4875 |
| 11,348,269 | B1 * | 5/2022 | Ebrahimi Afrouzi | G01S 17/48 |
| 11,430,233 | B2 * | 8/2022 | Kozicki | G06V 20/80 |
| 11,497,410 | B2 * | 11/2022 | Sherry | H04N 23/56 |
| 11,660,012 | B2 * | 5/2023 | Nowroozi | A61B 5/0507 |
| | | | | 600/430 |
| 2004/0022444 | A1 * | 2/2004 | Rhoads | G06V 20/80 |
| | | | | 382/232 |
| 2007/0235658 | A1 | 10/2007 | Zimdars et al. | |
| 2012/0183690 | A1 * | 7/2012 | Titulaer | H10F 77/707 |
| | | | | 427/256 |

OTHER PUBLICATIONS

Willis et al., "IInfraStructs: Fabricating Information Inside—Physical Objects for Imaging in the Terahertz Region," ACM Transactions on Graphics. vol. 32, No. 4, Jul. 2013, DOI: 10.1145/2461912.2461936, 10 pages.

Translation of the Written Opinion of the International Searching Authority dated Sep. 14, 2023, in connection with International Application No. PCT/FR2022/050363, 8 pages.

* cited by examiner

Fig 1
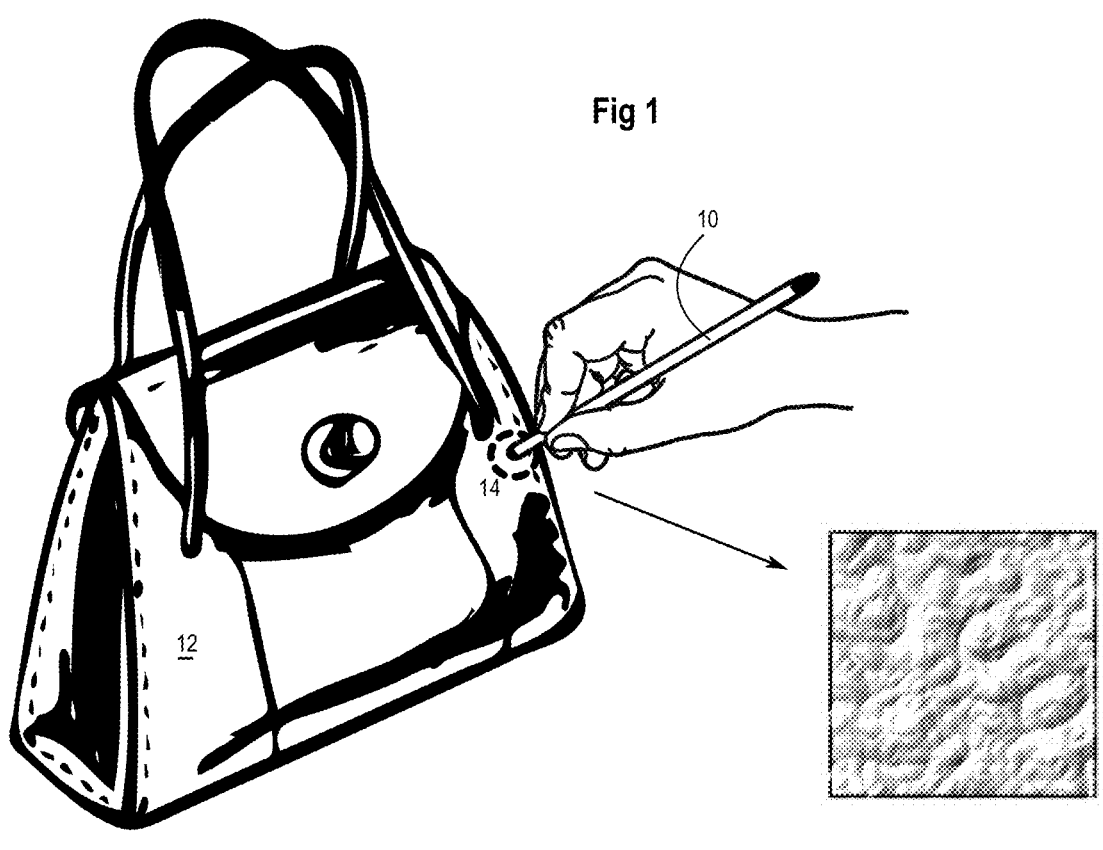
10
14
12
Fig 2
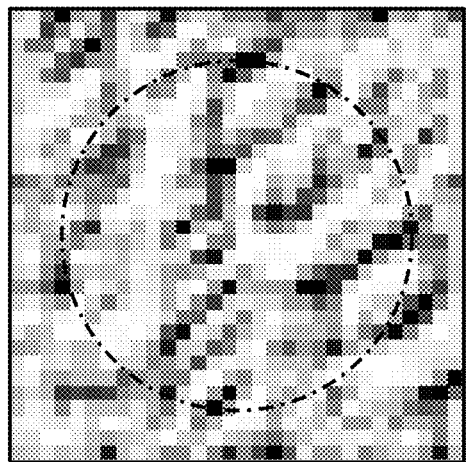
Fig 3

Fig. 4

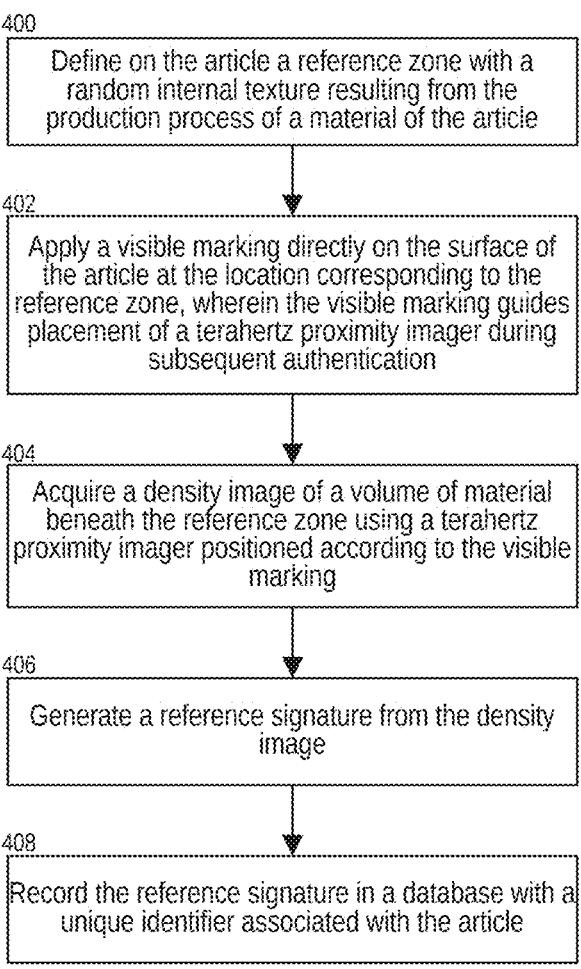

400
Define on the article a reference zone with a random internal texture resulting from the production process of a material of the article 402
Apply a visible marking directly on the surface of the article at the location corresponding to the reference zone, wherein the visible marking guides placement of a terahertz proximity imager during subsequent authentication 404
Acquire a density image of a volume of material beneath the reference zone using a terahertz proximity imager positioned according to the visible marking 406
Generate a reference signature from the density image 408
Record the reference signature in a database with a unique identifier associated with the article

PERSONALIZED AUTHENTICATION OF PRODUCTS USING TERAHERTZ WAVES

CROSS-REFERENCE TO RELATED APPLICATIONS

This application is a 371 National Stage of International Application No. PCT/FR2022/050363, filed Mar. 1, 2022, which claims priority to French Patent Application No. FR2101957, filed Mar. 1, 2021, the disclosures of which are herein incorporated by reference in their entirety.

FIELD

The invention relates to systems for authenticating products, such as luxury goods, or more generally products that need to be individually traced.

BACKGROUND

In the industries of luxury goods and products complying with strict safety or health standards, there is generally a desire to trace products individually. To achieve this, each product is given a unique identifier, such as a serial number, which is recorded in a manufacturer's database along with the product's characteristics, or even a picture of the product. The unique identifier is usually marked on the product, such as on a label or engraved.

To authenticate any product, the owner can compare the characteristics of the product in the manufacturer's database with those of the product to be verified, by providing the unique identifier. In the case of a luxury item, the user can compare the item with the picture in the database.

To authenticate certain items more reliably, it is known to use unique signatures based on physical characteristics of the items. During production, reference signatures are acquired and stored in a database. In a subsequent authentication phase, a signature is measured under the conditions of production and compared with the reference signature.

Patent GB2097979 describes an authentication system that uses a signature based on the surface condition of the product in a predefined reference zone. The signature consists, for example, of a frequency spectrum derived from the surface profile.

Since surface finish is a microscopic characteristic, the authenticity verification procedure requires sophisticated measuring equipment and very accurate placement of the measuring system on the predefined area, making the procedure impractical outside laboratory conditions.

U.S. Pat. No. 8,497,983 applies the principles of the above-mentioned GB2097979 patent by analyzing the article's reference zone using coherent light. The analysis system is aligned with the reference zone using a mechanical camera tracking system based on a reference image of the article with its reference zone.

Such a verification system remains complex and too costly to be widely adopted on the market. In addition, this technique can only authenticate a certain category of articles whose surface finish is irregular by nature, and which are not deformable or susceptible to wear. These are essentially metallic items, or at least made of hard materials, whose manufacturing processes are responsible for the surface finish (molding, machining, forging).

SUMMARY

A general method for authenticating an article is provided, comprising the following steps in a reference signature generation phase: acquiring a reference density image of a volume beneath a reference area of the article using a proximity terahertz imager array; and generating and storing a reference signature associated with the article from the reference density image.

The method may comprise the following steps in a subsequent authentication phase: acquiring a current density image of the volume beneath the reference area of the article using a proximity terahertz imager array; retrieving the reference signature associated with the article; and searching for the reference signature in the current density image.

The imager may comprise a pixel array larger than the reference zone.

The reference signature may be a sub-image including a sequence of pixels aligned in the reference area.

The reference signature may be a sub-image including the reference area.

The method may comprise the step of segmenting pixel values of the imager into a number of levels significantly smaller than the pixel resolution.

The method may comprise the step of segmenting the pixel values into three levels.

The proximity terahertz imager may be integrally implemented in CMOS technology.

The proximity terahertz imager may be a lensless reflection imager.

The terahertz proximity imager may be a near-field imager.

BRIEF DESCRIPTION OF THE DRAWINGS

The following non-limiting description is provided in relation to the attached figures, among which:

FIG. 1 shows an authenticatable article according to an embodiment, having a visually marked reference zone for application of a proximity terahertz imager;

FIG. 2 shows an enlarged view of an image acquired at the reference zone of the article shown in FIG. 1;

FIG. 3 shows a curve of pixel values along an axis of the acquired image of FIG. 2; and FIG. 4 is a flowchart illustrating steps on an authentication method according to an embodiment.

DETAILED DESCRIPTION

An obstacle to the wide adoption of article authentication systems based on the surface condition is the difficulty of providing low-cost and easy to use in situ measurement devices.

Another obstacle is that the techniques used to create and compare signatures are complex and unreliable, as they are based on microscopic features requiring high precision and high-resolution images.

To enhance the attractiveness of an authentication system based on the physical characteristics of items, the present disclosure identifies macroscopic features that can constitute unique signatures, and this for a wide range of item categories, including non-metallic and flexible items. It turns out that terahertz waves reveal macroscopic internal structures specific to the materials analyzed or to manufacturing techniques, and presenting a random character that lends itself well to the generation of a unique product signature.

In another field, terahertz waves have been used to verify the compliance of products with material composition criteria. For example, patent application US2010/0232715 discloses a system for verifying the content of certain materials having a characteristic oscillation frequency in a terahertz frequency band. A terahertz wave is directed at the product to be analyzed, and the system measures the spectrum of frequencies emitted by the product using a single terahertz detector. The measured spectrum is then compared with a reference spectrum, stored in a database, to calculate a conformity score for the analyzed product. This approach only verifies that a product has been manufactured in compliance with composition criteria and does not authenticate individual products.

According to a feature of the present authentication system, it is proposed to map the density of a volume of material under a reference zone of an article using a terahertz imager to extract a unique signature. Using a lensless proximity terahertz imager, the mapping is macroscopic, since the pitch of a pixel array of such an imager remains relatively large given the wavelengths involved. For example, at a frequency of 600 GHz, the pixel pitch of the imager is of the order of 200 μm. In comparison, a single pixel is four times larger than an entire reference area for a surface condition analysis according to patent GB2097979.

Preferably, the proximity imager is a lensless reflection imager, such as that described in patent application WO2019155156 to Hani Sherry, or a near-field imager, such as that described in patent application WO2019186074 to Hani Sherry. The imagers described in these patent applications are manufactured entirely in CMOS technology, making them compact, portable in the form of a stylus, and inexpensive. A 30×30 pixel imager with a 200 μm pitch, for example, measures 6×6 mm and can map the density of a macroscopic reference area of the same dimensions.

In practice, to account for the imager's placement uncertainty on the reference zone, which will be visually marked on the article, the reference zone is smaller than the imager's array, for example a 4×4 mm square or a 4 mm diameter disk for a 6×6 mm imager.

FIG. 1 illustrates the use of a proximity terahertz imager stylus 10 in an authentication phase or reference signature creation phase for an item, for instance a leather bag 12. In practice, the imaging stylus is designed to be brought into contact with the area to be scanned, the stylus end being sized to ensure the required spacing between the imager and the surface to be scanned.

The article identifies the reference zone for the signature by an apparent marking, here illustrated by a dotted circle 14 on a visible surface of the article. (Of course, for aesthetic reasons, the reference zone and its marking will in practice be arranged in a less apparent area, but nevertheless in an area that is accessible to an imaging stylus).

The marking 14 of the reference zone may also be traced to assist an accurate positioning of the stylus end. A relatively accurate positioning is preferable in the end-of-production phase, when the article's reference signature is recorded. In subsequent authentication phases, positioning is less important, as the imager is larger than the reference zone, and any offsets may be compensated for by image processing.

The diameter of the marking may thus be substantially equal to the diameter of the stylus end, e.g., 1 cm for a 6×6 mm imager. The effective reference area is preferably smaller, for example a 4×4 mm square (or less) or a 4 mm diameter disk (or less). Although image processing can correct rotation, relatively accurate rotational positioning may be achieved by matching markings on the reference zone and the stylus end. The end of the stylus could also be a square to be matched with a square marking on the article.

On the right-hand side of FIG. 1 is an example of the image produced by the stylus of the reference zone of the leather bag 12, when the pixels of the imager are configured in detector mode. A pixel in a terahertz imager may have two modes of operation, namely a detector mode in which the pixel simply provides the amplitude or power of the wave it receives, and a phase measurement mode in which the pixel also provides the phase of the received wave. The simplest structure is that of the detector mode, and it is more than sufficient for the authentication system disclosed here.

A proximity terahertz imager in detector mode performs absorption or density measurements throughout a certain thickness of material beneath the observed surface. The resulting image translates density levels into gray levels, revealing a macroscopic texture specific to the material observed and, where applicable, to the manufacturing process used. This texture is random and well suited for establishing a unique signature.

FIG. 2 is an enlarged view of the image shown in FIG. 1, as it would be rendered with a 30×30 pixel imager, i.e., at a rather low resolution. Indeed, the image of FIG. 1 has been represented with a high resolution to highlight the texture, but this texture is sampled at low resolution by the actual imager. This is not a disadvantage, as even a low-resolution image is sufficient to establish a unique signature, and with less complexity. In common applications, each pixel provides an 8- to 10-bit gray level.

In the image shown in FIG. 2, the smaller reference area has been delineated, for instance circular and centered. There are many possibilities for establishing a signature from the reference zone.

In an embodiment, a sequence of gray levels located on a diameter of the circle, for example in a central column or row of pixels, or on a diagonal of the array, may be stored as a reference signature.

FIG. 3 shows an example of a grayscale sequence obtained, in the form of a curve. This sequence is measured in a step at the end of the item's production and recorded in a database together with the item's serial number or other unique identifier. The measurement may be carried out manually, using the same type of stylus as that used for subsequent authentications. For a 30×30 pixel imager, the sequence or curve includes around twenty samples coded with the imager's accuracy, in practice 8 to 10 bits.

During an authentication phase, a user acquires an image of the item's reference area using a stylus with the same characteristics as the one used to record the reference signature. This image is sent, for example, to a central authentication system, together with the item's serial number. Using the serial number, the central system retrieves the reference signature, in the form of a sub-image, and attempts to locate it in the image supplied. Known techniques for this type of operation, such as the motion estimation used in MPEG video coding, provide a correspondence score with a motion vector or transformation matrix. For the purposes of the present system, simply comparing the score with a threshold is sufficient to decide that there is a match, and therefore that the item being verified is genuine.

These sub-image search techniques tolerate a fairly wide range of offset and rotation errors, so that the authenticating user does not need to take great care in aligning the stylus with the reference area. On the other hand, it is preferable that the reference zone is contained within the acquired image.

In another embodiment, the sub-image corresponding to the reference area may be stored as a reference signature. This sub-image may be used in the same way as a grayscale sequence, as described above, but will require more storage and processing resources. This embodiment may therefore be better suited to materials with less marked textural variations, i.e., where a single line of pixels may not be sufficient to establish a unique signature.

It may turn out that the accuracy of the imager's pixels is excessive for the purpose of guaranteeing signature uniqueness, especially when the entire image of the reference area is used as a signature. In this case, the measurements may be segmented into fewer levels than the bit resolution of the pixels, e.g., 8 levels instead of 256 for 8 bits, or even just 3 levels (white, grey, and black). Applying such segmentation in the production and authentication phases significantly reduces the resources required to store and recognize signatures.

Although, by way of example, a leather bag has been described as the item to be authenticated, the system is applicable to any material with a certain transparency to terahertz radiation, even materials with a uniform visual appearance, such as plastics. Plastics have internal textures related to their manufacturing processes, such as injection molding, and a particular structural grain, which become visible to terahertz radiation and have a random character.

The system is particularly well suited to items made of composite materials. In this case, terahertz radiation reveals fibers embedded in resin with remarkable contrast, requiring very few gray levels to guarantee unique signatures.

FIG. 4 is a flowchart illustrating steps of an authentication method according to an embodiment.

At step 400, the method includes defining on the article a reference zone with a random internal texture resulting from a production process of a material of the article.

At step 402, a visible marking is applied directly on a surface of the article at a location corresponding to the reference zone. The visible marking guides placement of a terahertz proximity imager during subsequent authentication.

At step 404 a density image is acquired of a volume of material beneath the reference zone using a terahertz proximity imager positioned according to the visible marking.

At step 406 a reference signature is generated from the density image.

At step 408 the reference signature is recorded in a database with a unique identifier associated with the article.

The invention claimed is:

1. A method for authenticating an article, comprising the following steps in an end-of-production phase of the article:
  defining on the article a reference zone with a random internal texture resulting from a production process of a material of the article;
  applying a visible marking directly on a surface of the article at a location corresponding to the reference zone, wherein the visible marking guides placement of a terahertz proximity imager during subsequent authentication;
  acquiring a density image of a volume of material beneath the reference zone using a terahertz proximity imager positioned according to the visible marking;
  generating a reference signature from the density image; and
  recording the reference signature in an authentication system with a unique identifier associated with the article, wherein the authentication system is configured to:
  receive a current density image of the article's reference zone acquired during a subsequent authentication phase; and
  return the reference signature associated with the article using the unique identifier.

2. The method according to claim 1, comprising the following steps in a subsequent authentication phase of the article:
  finding the reference zone on the article using the visible marking;
  acquiring the current density image of the article's reference zone using a terahertz proximity imager;
  receiving the reference signature associated with the article from the authentication system; and
  searching for the reference signature in the current density image.

3. The method according to claim 1, wherein the imager comprises a pixel array larger than the reference zone.

4. The method according to claim 3, wherein the reference signature is a sub-image including a sequence of pixels aligned in the reference zone.

5. The method according to claim 3, wherein the reference signature is a sub-image including the reference zone.

6. The method according to claim 4, comprising the following step:
  segmenting pixel values of the imager into a number of levels smaller than a bit resolution of a pixel.

7. The method according to claim 6, comprising the following step:
  segmenting the pixel values into three levels.

8. The method according to claim 1, wherein the proximity terahertz imager is integrally implemented in CMOS technology.

9. The method according to claim 8, wherein the proximity terahertz imager is a lensless reflection imager.

10. The method according to claim 8, wherein the terahertz proximity imager is a near-field imager.

11. The method according to claim 5, comprising the following step:
  segmenting pixel values of the imager into a number of levels smaller than a bit resolution of a pixel.

12. The method according to claim 11, comprising the following step:
  segmenting the pixel values into three levels.

* * * * *